United States Patent [19]
Davis et al.

[11] 3,931,530
[45] Jan. 6, 1976

[54] APPARATUS FOR CONTROLLING THE SUPPLY OF POWER TO A RESISTIVE LOAD

[75] Inventors: Rex Mountford Davis, Loughborough; Brian Robert Downing, Nottingham, both of England

[73] Assignee: National Research Development Corporation, London, England

[22] Filed: July 19, 1974

[21] Appl. No.: 490,187

[30] Foreign Application Priority Data
July 19, 1973 United Kingdom............... 34487/73

[52] U.S. Cl............... 307/133; 219/288; 323/22 SC
[51] Int. Cl.²........................................ H01H 9/56
[58] Field of Search..... 307/133, 134, 135, 252 UA; 219/275, 284, 285, 286, 287, 288, 289, 501, 486; 323/22 SC, 24

[56] References Cited
UNITED STATES PATENTS
2,598,490  5/1952  Berg et al. .......................... 219/287
3,753,044  8/1973  Hawker et al. ..................... 307/133

*Primary Examiner*—James R. Scott
*Assistant Examiner*—M. Ginsburg
*Attorney, Agent, or Firm*—Cushman, Darby and Cushman

[57] ABSTRACT

In apparatus for controlling the supply of power from an alternating current electrical supply of at least three phases to a resistive load, the load is so arranged that there exist current paths both between each phase connection of the load and two adjacent phase connections of the load and between each phase connection of the load and a common point which is directly connected to the neutral of the supply. The switching means for connecting each phase of the load to the corresponding phase of the supply is arranged to change from a non-conducting to a conducting state only when the voltage across such switching means is substantially zero, and to change from a conducting to a non-conducting state only when the current through each switching means is substantially zero.

5 Claims, 3 Drawing Figures

U.S. Patent   Jan. 6, 1976   3,931,530
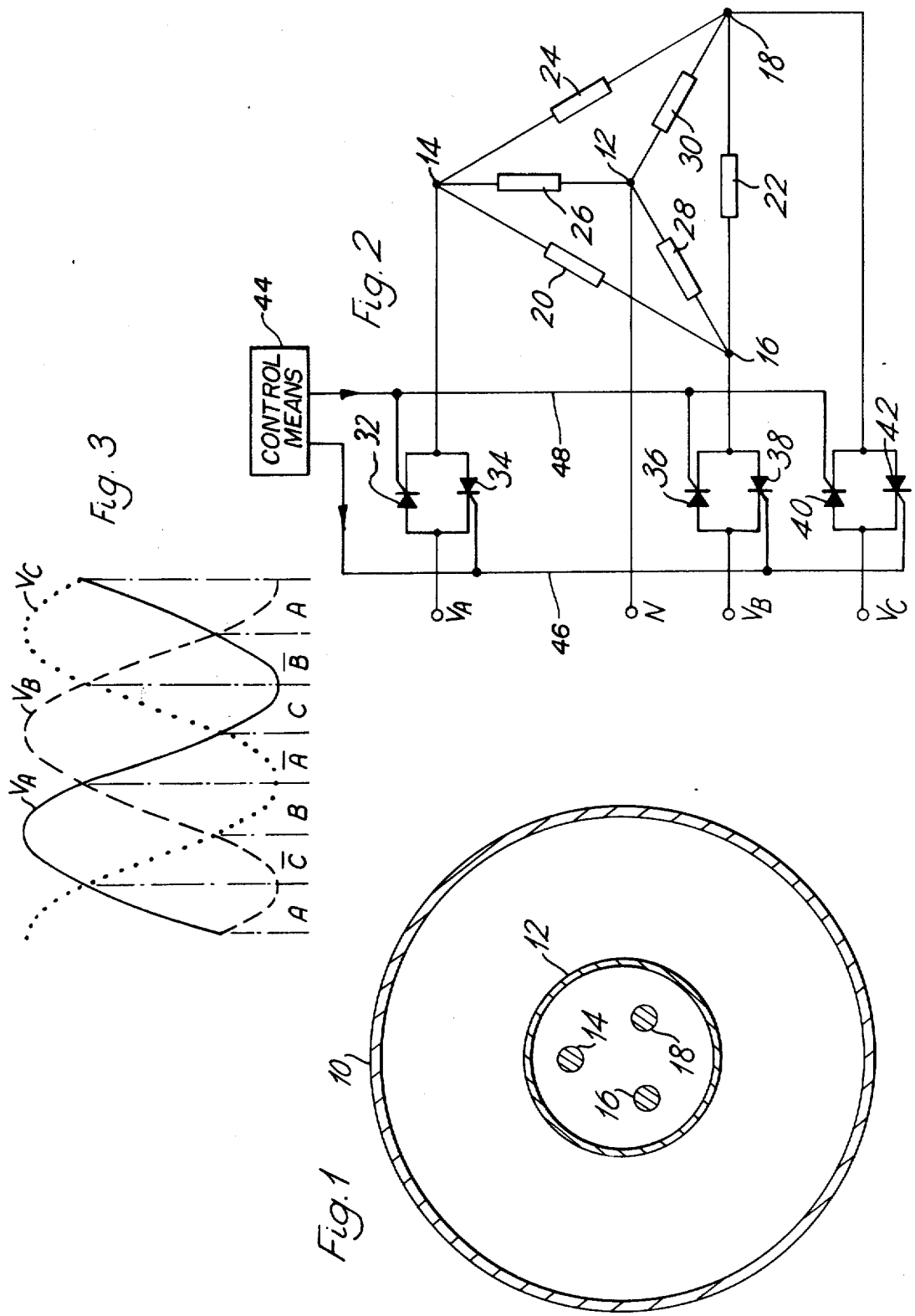

APPARATUS FOR CONTROLLING THE SUPPLY OF POWER TO A RESISTIVE LOAD

This invention relates to apparatus for controlling the supply of power to a resistive load. It has particular, but by no means exclusive application to controlling the power supply for an electrode boiler or water heater.

An electrode boiler consists of an enclosure for a liquid to be heated and means for causing an electric current to flow through the liquid. Frequently, such boilers are arranged to be powered from a three-phase supply and have three electrodes, each connected to a respective phase and each of which is surrounded by a so-called neutral shield which is connected to the neutral point of the three-phase supply. It will be obvious that alternating current must be used in order to prevent electrolysis from taking place. It has been found that, where one or more of the products of electrolysis is a gas, it is necessary to ensure that the alternating current supply does not contain components of frequency less than 10Hz if production of gas is to be avoided. It will be appreciated that, in the case of water, hydrogen and oxygen would be evolved at each electrode in alternate half cycles, producing an explosive mixture.

Up to now, control of the power supplied to an electrode boiler has been effected by having mechanically movable insulating sheaths which can be moved over the electrodes to reduce the surface area confronting the corresponding neutral shield. This requires machinery to move the sheaths and can be prone to water leakage where this machinery passes through the boiler wall.

According to the invention, apparatus for controlling the supply of power from an alternating current electrical supply of at least three phases to a resistive load comprises means for so connecting the load that there exist current paths both between each phase connection of the load and two adjacent phase connections of the load and between each phase connection of the load and a common point which is directly connected to the neutral of the supply, respective switching means for each phase for selectively connecting the phase connection of the load to the corresponding phase of the supply and control means for operating the switching means in a selected sequence and arranged to change each switching means from a non-conducting to a conducting state only when the voltage across such switching means is substantially zero, and to change each switching means from a conducting to a non-conducting state only when the current through each switching means is substantially zero.

The switching means for each phase may comprise a pair of oppositely poled thyristors connected in parallel. Alternatively, it may comprise a triac.

One of the problems with a resistive load such as an electrode boiler is that since the load has no significant reactance, a current transient is drawn from the supply if the switching means is switched on when any significant voltage is present across the switching means. In accordance with the invention this is avoided by ensuring that the thyristors or triacs are only fired when the voltage across them is substantially zero. They will, of course, cut off only when the current flowing through them falls substantially to zero.

Existing methods of integral half-cycle control also adopt zero-voltage switching as above but when used for single phase loads can only produce a substantial number of intermediate power levels when the conduction sequence extends over many periods of the supply. A conduction pattern occupying N periods produces, in the worst circumstances, a supply current having a component at 1/Nth of the supply frequency. Components of current at frequencies below 25Hz and particularly in the region of 10Hz create severe problems of lamp flicker caused by voltage drops produced by these currents flowing in the supply impedance.

Three phase loads connected as three single phase loads in a star or in a delta configuration suffer from the same disadvantages.

In accordance with the invention, a load having both star and delta configurations in conjunction with a four-wire supply enables a much larger variety of conduction sequences, and hence power levels, to be obtained when the conduction sequences occupy only three supply periods. For conduction sequences occupying three periods of the supply there are 38 discrete conduction sequences with corresponding intermediate power levels. Of these there is a substantial proportion of sequences which generate lamp flicker at or above two-thirds of the supply frequency which is not noticeable.

In order that the invention may be more readily understood, an embodiment thereof, applied to an electrode boiler, will now be described with reference to the accompanying drawings, in which:

FIG. 1 is a cross-sectional view of an electrode boiler arranged for operation in accordance with the invention;

FIG. 2 is a circuit diagram showing the equivalent circuit of the electrode boiler shown in FIG. 1; and FIG. 3 is a waveform diagram of a three-phase supply, illustrating thyristor firing times.

Referring first to FIG. 1, an electrode boiler consists of a cylindrical boiler shell 10 which is electrically earthed. Approximately coaxial with the boiler shell 10 is an electrically conductive neutral shield 12 which is connected to the neutral of the electrical supply. Within the shield 12 are three uniformly spaced electrodes 14, 16 and 18, one for each phase of the supply. All the heat is, of course, produced within the neutral shield. The boiler is preferably arranged with its cylindrical axis vertical and the neutral shield 12 constructed so that it does not reach the end faces of the boiler. This enables convection currents in the liquid to cause flow upwards within the neutral shield 12 and downwards outside it thereby ensuring mixing of the heated liquid from within the neutral shield with other liquid in the rest of the boiler. If for some reason it is desired to operate the boiler with its cylindrical axis horizontal, apertures must be provided in the neutral shield 12 to allow convection currents to flow.

Referring to FIG. 2, it will be seen that the equivalent circuit of the electrode boiler consists of three phase-to-phase resistances 20, 22 and 24 and three phase-to-neutral resistances 26, 28 and 30. The electrode 14 is connected to the A-phase terminal of the supply via thyristors 32 and 34, the electrode 16 to the B-phase via thyristors 36 and 38, and the electrode 18 to the C-phase via thyristors 40 and 42. The neutral shield is connected to the neutral N of the supply.

FIG. 3 shows the possible times during each cycle of the supply when gating signals may be applied to the thyristors. Thyristors 32, 36 and 40 can conduct during positive half-cycles and gating signals may be applied during time intervals A, B and C respectively. Thyristors 34, 38 and 42 can conduct during negative half-cycles and gating signals may be applied during time intervals $\bar{A}$, $\bar{B}$ and $\bar{C}$ respectively. A thyristor to which a gating signal is applied fires as soon thereafter as it ceases to be reverse biased. The time at which this happens depends on which of the other thyristors are already conducting.

If in any sequence a phase contributes zero power, severe imbalance occurs. This situation is unavoidable for the two lowest power levels but the elimination of other sequences to which this applies leaves 31 still acceptable.

The following table shows twenty four gating sequences (plus zero power and full power) which have been selected both to minimise lamp flicker and so that they all end with the same thyristor conducting, thus allowing any two sequences to be linked together as is required when a change of power is to be effected.

ciently large. Voltage fluctuation due to switching between power levels can be minimised by minimising the resulting r.m.s. current change in each phase. Accordingly, it is preferable to choose the required number of different power levels from among those shown in the table such that the difference in r.m.s. currents in each phase between adjacent power levels is as uniform as possible.

Gating sequences which repeat over four cycles or five cycles can be used to obtain a greater variety of power levels. However, they impose a more severe constraint on the supply impedance if perceptible lamp flicker is to be avoided.

In FIG. 2 the thyristors are selectively fired by means of control means 44 which include a store holding the sequences shown in the preceding table, circuits for selecting and changing from one sequence to another and circuits for generating firing signals for the thyristor from the sequence selected. The circuits for gen-

| Power % | Gate Signals A $\bar{C}$ B A C $\bar{B}$ A $\bar{C}$ B | R.M.S. Currents (%) Phase A | Phase B | Phase C |
|---|---|---|---|---|
| 0.00 | 0 0 0 0 0 0 0 0 0 | 0. | 0. | 0. |
| 6.54 | 0 0 0 0 0 0 0 0 1 | 0. | 33.99 | 0. |
| 12.76 | 0 1 0 0 0 0 0 0 1 | 0. | 33.41 | 33.41 |
| 18.99 | 0 1 0 1 0 0 0 0 1 | 33.41 | 33.41 | 32.82 |
| 25.22 | 0 1 0 1 0 1 0 0 1 | 32.82 | 47.24 | 32.82 |
| 30.40 | 1 1 0 0 0 0 0 0 1 | 62.45 | 49.06 | 49.06 |
| 31.74 | 0 1 0 1 1 0 0 0 1 | 51.47 | 33.41 | 61.36 |
| 36.63 | 0 1 1 1 0 0 0 0 1 | 49.06 | 70.83 | 48.66 |
| 36.94 | 0 0 1 1 1 0 0 0 1 | 62.45 | 59.68 | 49.06 |
| 37.66 | 0 1 1 0 1 0 1 0 1 | 32.82 | 61.04 | 61.04 |
| 38.58 | 1 0 0 0 1 1 0 0 1 | 51.85 | 73.32 | 51.85 |
| 41.51 | 1 1 1 0 0 0 0 0 1 | 60.16 | 69.38 | 60.16 |
| 42.86 | 0 1 0 1 1 1 0 0 1 | 48.66 | 59.36 | 70.55 |
| 47.74 | 0 1 1 1 1 0 0 0 1 | 60.16 | 68.81 | 69.10 |
| 48.05 | 1 1 1 0 0 1 0 0 1 | 60.16 | 77.26 | 60.16 |
| 49.38 | 1 0 1 1 1 0 0 0 1 | 80.93 | 71.10 | 49.06 |
| 49.69 | 1 0 0 1 1 1 0 0 1 | 71.38 | 71.38 | 62.45 |
| 52.62 | 1 1 1 1 0 0 0 0 1 | 77.63 | 77.63 | 57.78 |
| 53.66 | 1 1 1 0 1 0 1 0 1 | 68.53 | 68.82 | 68.53 |
| 55.30 | 1 0 1 1 1 0 1 0 1 | 87.33 | 70.83 | 48.66 |
| 60.49 | 1 0 1 1 1 1 0 0 1 | 79.17 | 86.39 | 60.16 |
| 63.73 | 1 1 1 1 1 0 0 0 1 | 85.08 | 75.80 | 75.80 |
| 69.65 | 1 1 1 1 1 0 1 0 1 | 91.19 | 75.54 | 75.54 |
| 74.84 | 1 1 1 1 1 1 0 0 1 | 83.41 | 90.29 | 83.41 |
| 85.65 | 1 1 1 1 1 1 1 0 1 | 96.57 | 96.57 | 81.71 |
| 100.00 | 1 1 1 1 1 1 1 1 1 | 100 | 100 | 100 |

The precise percentage power levels obtained with each sequence vary with the ratio of phase-to-phase resistance to phase-to-neutral resistance of the electrode boiler. This ratio is, of course, determined by the diameter of the neutral shield 12 relative to the distances between the electrodes 14, 16 and 18. The values shown in the table are those obtained when this ratio is 0.7.

All of the sequences shown in the table repeat over three cycles. Only half of each sequence is shown, the second half being the converse of the first half so that if gate signal $\bar{A}$ is 0 at the beginning of the first half of the sequence for example, gate signal A is 0 at the beginning of the second half of the sequence. This ensures that there is no d.c. component in any phase. If the temperature in the electrode boiler is being maintained at a particular value or changing in accordance with a particular profile under automatic control, there may well be frequent changes between adjacent power levels. The time constant of most thermal loads is such that hunting of this nature usually takes place at frequencies below 1Hz. At these frequencies, lamp flicker is perceptible if the resulting voltage fluctuation is suffierating firing signals are arranged to supply such signals to a thyristor only when the voltage across the thyristor is substantially zero. Since these circuits and the store may be of known types readily accessible to those familiar with this field, they are not described in detail. Firing signals pass along channels 46 and 48 shown by single lines in FIG. 2.

We claim:

1. Apparatus for controlling the supply of power from an alternating current electrical supply of at least three phases and a neutral to a resistive load comprising:

means for connecting the load as a combined star-delta load having current paths both between (a) each phase connection of the load and two adjacent phase connections of the load and (b) between each phase connection of the load and a common point which is directly connected to said neutral, a plurality of switching means connected to the supply, one for each phase, for selectively connecting the phase connection of the load for that phase to the corresponding phase of the supply, each said switching means having a conducting and a non-conducting state, and control means connected to said switching means for changing the various switching means from their non-conducting stages to their conducting states and vice versa in a selected sequence and for changing the sequence selected, said control means including means for changing each switching means from its non-conducting to its conducting state only when voltage across that switching means is substantially zero, each switching means changing from its conducting to its non-conducting state only when current through that switching means is substantially zero.

2. Apparatus as claimed in claim 1, in which the switching means for each phase comprises a pair of oppositely poled thyristors connected in parallel.

3. Apparatus as claimed in claim 1, in which the resistive load comprises an electrode boiler including the connecting means comprising a respective electrode for each phase of the supply, the electrodes being uniformly spaced and disposed symmetrically within an electrically conductive member which is connected to the neutral of the supply.

4. Apparatus according to claim 1 wherein said control means includes means for causing each said selected sequence to have a duration of three cycles of the supply current.

5. Apparatus according to claim 1 further including said load.

* * * * *